REGISTER A

INVENTOR
JOHN L. ANDERSON
BY [signature]
ATTORNEY

Jan. 11, 1966 J. L. ANDERSON 3,229,255

MEMORY SYSTEM

Filed Dec. 10, 1959 6 Sheets-Sheet 2

Jan. 11, 1966 J. L. ANDERSON 3,229,255

MEMORY SYSTEM

Filed Dec. 10, 1959 6 Sheets-Sheet 4

United States Patent Office 3,229,255

Patented Jan. 11, 1966

3,229,255
MEMORY SYSTEM

John L. Anderson, Poughkeepsie, N.Y., assignor to International Business Machines Corporation, New York, N.Y., a corporation of New York Filed Dec. 10, 1959, Ser. No. 858,793
2 Claims. (Cl. 340—172.5)

This invention relates to memory systems and more particularly to novel circuitry for entering information into and retrieving information from such systems.

In general, large capacity memory systems according to the prior art can be classified by the manner in which selected word registers may be interrogated in order to perform read and write operations. Examples of such memory systems include coordinate address memory systems, catalog memory systems, associative memory systems, and fully associative memory systems. Coordinate address memory systems are characterized by the fact that a plurality of groups of selection lines are interconnected throughout the system in such a manner that energization of selected lines in each group is effective to select a unique word register. Catalog memory systems include means to indicate whether or not a particular word is contained within the memory system by comparing the information stored in each register with the information contained in a particular word. Additionally, provision may be incorporated to read out the word if it is in storage. Associative memory systems include auxiliary registers which are known as tag registers wherein identification words are stored in a separate register for each word stored in the main registers. The memory may be interrogated by applying to the tag register, signals representative of a particular tag and if that tag is present in a tag register an indication is attained and the corresponding word is read out of the main register. A fully associative memory system has the ability to find any word stored in memory when any fraction of the word is known. More generally stated, a fully associative memory system is an extension of an associative memory system wherein no separate tag registers are necessary; rather a tag representation may be any portion or all of the word itself. Although each of the above described memory systems have individual desirable characteristics it has not been possible until now to combine these characteristics into a single, efficient and economical memory system.

The memory system according to the invention, however, is selectively interrogated in the manner of each of the above systems by means of novel and simple circuitry to thereby obtain the advantages of each of the systems of the prior art. Further, when a register of the memory system of the invention has been conditioned by any of the above interrogation methods, information contained therein is nondestructively read out or new information entered there in independent of the method by which the register has been conditioned.

According to the principles of the invention interrogation of the memory system is divided into two basic classes. The first selects particular registers by means of an address which is independent of the information actually stored in the registers. This is the well-known coordinate address memory system and operation in this manner is hereinafter referred to as operation in the cordinate address mode. The second interrogation class selects particular registers in accordance with the information stored in the registers and independently of any particular address assigned thereto. This class includes the catalog memory systems, associative memory systems and the fully associative memory systems. When the memory system of the invention is operated as a catalog memory, interrogation is performed by applying signals representative of a particular word to each of the storage devices of all registers. If the desired word is stored in memory an indication is obtained and read-in, read-out or reset operations may thereafter be performed on the selected register containing the particular word upon which a comparison has been obtained. In a similar manner, when the memory system of the invention is operated as an associative memory, interrogation is performed by applying signals representative of a particular tag to each of the storage devices of all registers wherein the tag information is stored. Again all registers having a particular tag being interrogated will be selected. When the memory system of the invention is operated as a fully associative memory, signals representative of some or all of the information stored in the registers are applied to those storage devices of all registers of the memory system wherein the portion of information being interrogated may be stored. These signals, or association patterns, will thereupon select those registers whose storage devices contain the portion of information upon which interrogation has been performed. As will be understood from the more detailed description to follow, the extreme versatility of the memory system of the invention may be illustrated, by way of example, in that the system may be interrogated to read out words serially or in numerical order, or to read out words having the same information in particular portions in each register. This operation is similar to sorting or merging record cards, and, further, the memory system may also be completely reset in a single operation. When the memory system is selectively operated as a catalog memory system, an associative memory system, or a fully associative memory system it is hereinafter referred to as operation in the associative address mode. Further, in order to detect a defective register in a memory system operable in the associative address mode, a coordinate address mode of operation is mandatory.

The phenomenon of superconductivity has been employed in the design of gating devices useful in computers, memory systems, and other applications. Briefly, these gating devices include a gate conductor of superconductive material the resistance of which is controlled by current flow in an associated control conductor. The gate conductor is operated at a temperature at which the gate conductor is normally superconducting. The gate conductor thereby exhibits zero electrical resistance to current flow. Current flow in the associated control conductor is effective to produce a magnetic field, which when applied to the gate conductor, destroys superconductivity therein and the gate conductor then exhibits normal resistance. Further information on superconductive gating devices and a discussion of some logical circuits assembled therefrom is contained in an article by D. A. Buck, entitled "The Cryotron—A Superconductive Computer Component" which appeared in the Proceedings of the IRE, vol. 44, No. 4 pp. 482–493, April 1956.

Cryogenic memory systems employing superconductive gating devices are disclosed in copending applications Serial No. 744,157 filed June 24, 1958, now Patent No. 3,134,095 on behalf of Harold H. Heath, Jr., and Serial No. 781,749 filed Dec. 19, 1958 now Patent No. 3,101,649 on behalf of John L Anderson, each of which has been assigned to the assignee of this invention. The former copending application is direction to a novel associative memory system and circuit usable in such systems, while the latter copending application is directed to novel circuitry for performing the operations of writing, reading, and resetting of information in various superconductive memory systems wherein coordinate address selection is employed. In accordance with the principle of the present invention, there is provided novel circuitry for interrogating registers in a memory system which is particularly adapted for use in systems of the above described type. For this reason, the operation of the invention will be described wtih respect to a superconductive memory system as a preferred embodiment, but it should be understood that the principles of the invention may be adapted to many other types of systems.

Briefly, the invention, as illustrated in the preferred embodiment, comprises a memory system wherein, during quiescent conditions, a current flows in a superconducting path through each of the storage devices in all the registers of the system and is later selectively operated upon to perform either the operation of writing, reading or resetting. The superconducting path in a selected register is caused to become resistive, so as to shift the current flowing through the storage devices therein to an alternate path at the selected register only. With the current flowing through this alternate path it is then operated upon to perform any of the desired operations. To accomplish this current shift, when the system is operated in the coordinate address mode, an XY coordinate address selector at the selected register electrically connected in series with all the storage devices thereat is caused to become resistive. A current shift is accomplished when the memory is operated in the associative address mode by causing the superconducting path through all the storage devices at the register storing predetermined information to become resistive in response to both the association pattern of the predetermined information and to the information actually stored in the registers.

It is an object of the invention therefore to provide an improved memory system.

Another object of the invention is to provide a memory system which may be selectively addressed as a coordinate memory system, catalog memory system, associative memory system, or a fully associative memory system.

Still another object of the invention is to provide a memory system wherein selected registers may be addressed in either the coordinate address mode or the associative address mode.

A further object of the invention is to provide an improved superconductive memory system.

Yet another object of the invention is to provide an improved memory system wherein words may be read out in numerical order.

A still further object of the invention is to provide an improved memory system wherein any word in memory may be located when a fraction of the word is known.

Another object of the invention is to provide a superconductive memory system wherein words may be located in response to an association pattern.

Still another object of the invention is to provide an improved memory system wherein words having the same information in particular portions of each register may be serially read out.

A still further object of the invention is to provide a memory system that may be completely reset in a single operation.

The foregoing and other objects, features and advantages of the invention will be apparent from the following more particular description of a preferred embodiment of the invention, as illustrated in the accompanying drawings.

Figures 1, 1A:
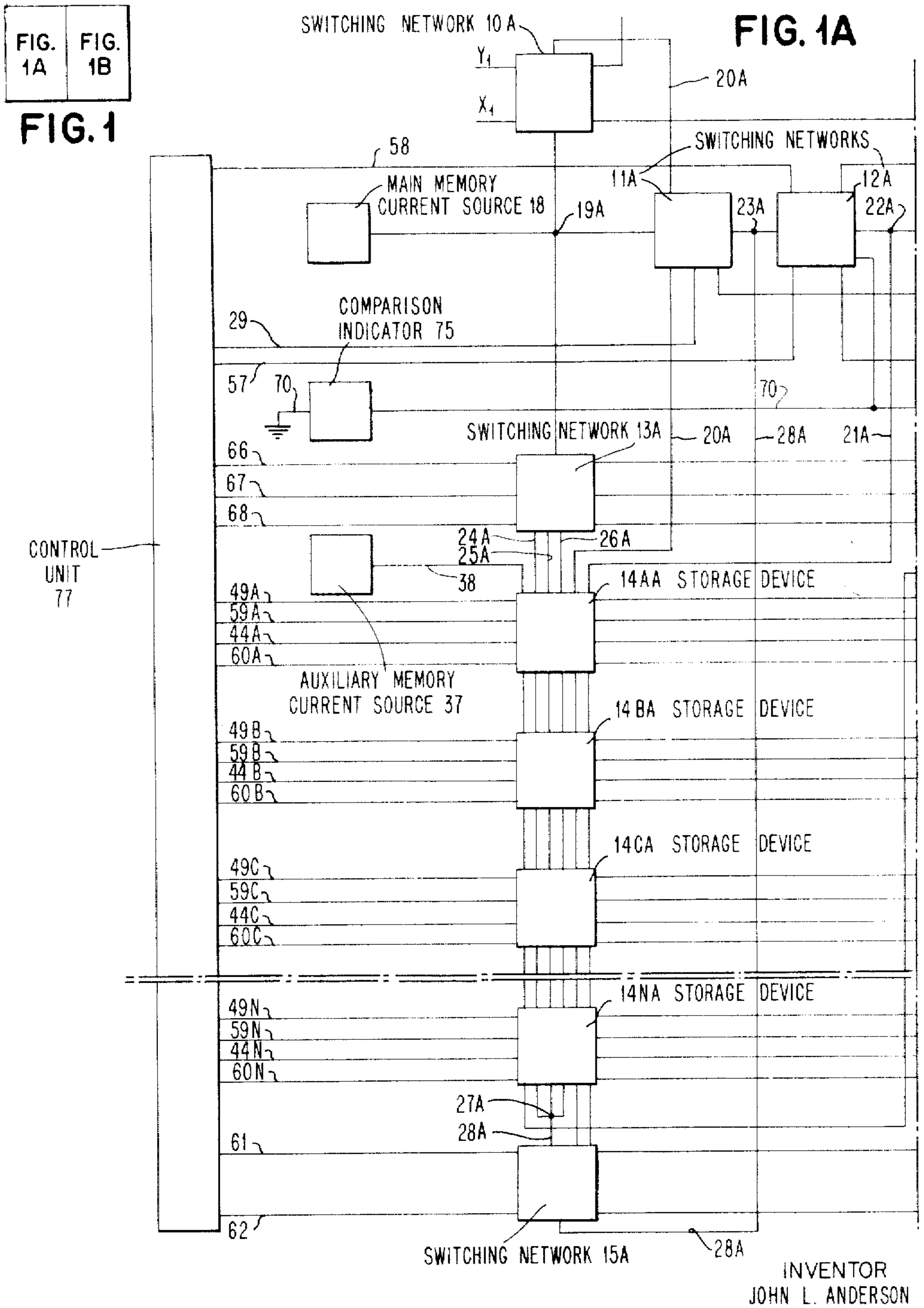
FIG. 1 is a block diagram indicating the interconnection between FIG. 1A and FIG. 1B.
FIG. 1A is a block diagram of a portion of the memory system of the invention.
Figure 1B:
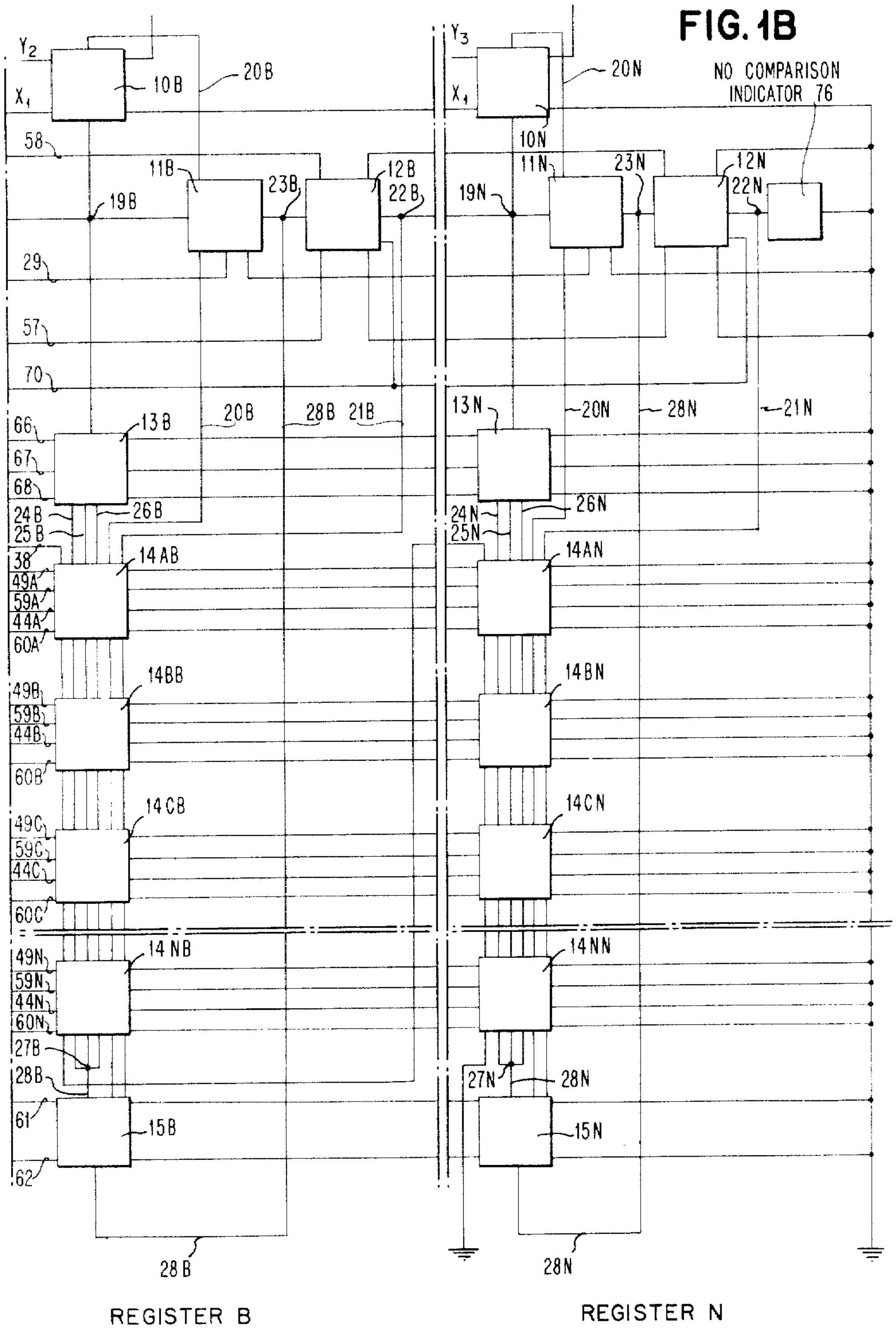
FIG. 1B is a block diagram of another portion of the memory system of the invention.

Referring now to the drawings, FIG. 1 indicates the manner in which FIG. 1A and FIG. 1B together form a diagram of the memory system of the invention wherein the various functional components which comprise the system are shown in block diagram form. For illustrative purposes only, the block diagram shows three vertically arranged registers A, B, and N, each including four storage devices, but it should be understood that a greater or lesser number of both registers and storage devices may be employed as required. Throughout the detailed description of the memory system to follow, and as shown in the block diagram, blocks representing similar components in each register are designated by the same numeral, the blocks within a particular register being differentiated through the use of letters appended to these numerals. Thus, the designations for the blocks in the first register end with the letter A; the designations for the blocks in the second register end with the letter B; and the designations for the blocks in the final register end with the letter N. However, in the general description to follow, letters will not be employed unless the operation of a particular register or component thereof is being uniquely described. For example, though each of the registers A, B, and N is provided with a switching network identified by the numeral 10 followed by the appropriate letter A, B, or N, in the general descriptions immediately following, these switching networks are referred to merely by their numeral designation 10.

Before proceeding with the detailed description of the circuits and operation of the memory system of the invention, the functions of the various units of the block diagram are first briefly outlined. The various operations of the memory system are controlled by a data processing control unit 77 (FIG. 1A). A switching network designated as block 10 is effective to condition a register for read-in and read-out operations in response to a unique location address. Blocks 11 and 12 represent switching networks operable when a register is conditioned for read-in and read-out operations. Block 13 represents yet another switching network effective to select a read-in, read-out or reset operation as directed by control unit 77. The storage devices of the register are represented by each of the blocks 14 and block 15 represents a switching network employed when the system is operated in the associative address mode.

A current source, represented by block 18, is effective to deliver a current, hereinafter designated the main memory current, which flows through each of the registers and is selectively operated upon to perform a read-in or read-out operation. Another current source, represented by block 37, delivers a current, hereinafter designated the auxiliary memory current, which flows through each of the storage device of the system, and is effective to store and maintain either a binary one or a binary zero, as the case may be, in each of the storage devices. A pair of indicators 75 and 76 are employed when the memory system is operated in the associative address mode to indicate whether or not a comparison has been found between the information stored in the registers and an association pattern.

In general, the main memory current from source 18 normally flows through a quiescent superconducting path in each of the registers of the system. However, when registers are conditioned by any of the interrogations means hereinafter described, this current is shifted through alternate superconducting paths at the selected registers only. Control unit 77 is then effective to direct the current flowing through the alternate paths to still other superconducting paths to perform a read-in or read-out operation.

Figure 2:
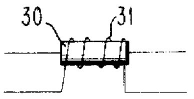
FIG. 2 is an illustration of a gating device useful in the invention.

Each of the blocks shown in the block diagram of FIG. 1A and FIG. 1B comprise one or more superconducting gating devices which may be, by way of example, of the type illustrated in FIG. 2. As shown therein, a gating device consists of a gate conductor 30 of superconductive material around which is wound a control conductor 31. The gating device is operated at a sufficiently low temperature such that the gate conductor is superconducting in the absence of any applied magnetic field. The gate conductor is, however, driven into the normal resistance state by energizing the control conductor with a current of sufficient magnitude to generate a magnetic field which, when applied to the gate conductor, exceeds the critical magnetic field value of the gate conductor. Control conductor 31 is, in general, fabricated of a hard superconductive material, that is, one that remains superconducting in the presence of a value of magnetic field greater than that which destroys superconductivity in the gate conductor. In this manner, gate and control conductors of various gating devices may be serially connected with only selected gate conductors being switched between the superconducting and normal resistance states. When two gate conductors are electrically connected in parallel, one being superconducting and the other being resistive, a current applied to the parallel combination will flow entirely through the superconducting conductor, although the other conductor may exhibit only a few tenths of an ohm resistance. If now the resistive gate conductor is allowed to become superconducting, the current will continue to flow through the original superconducting conductor. Current is caused to flow, therefore, through a selected path which is maintained superconducting, while other paths in parallel are maintained resistive and which later may become superconducting.

Figure 3:
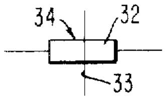
FIG. 3 is a representation of the device of FIG. 2.

In addition to the gating devices shown in FIG. 2, gating devices of the type shown and described in copending application Serial No. 625,512, filed Nov. 30, 1956, in behalf of Richard L. Garwin and assigned to the assignee of this application, may also be employed in a memory system of the present invention. For this reason, the diagrammatic representation illustrated in FIG. 3 will be employed in each of the schematic diagrams of the memory system to represent either of these types of superconductive gating devices. As shown in FIG. 3, a bar 32 represents a gate conductor and a cross arm 33 represents a control conductor similar to the gate and control conductors shown in FIG. 2. Further, as an aid in following the various circuit paths to be described in the paragraphs to follow, a numeral is assigned to each of the gating devices in the circuit diagrams located adjacent each gating device as indicated by reference numeral 34 in FIG. 3, in order to identify a particular gating device.

COMPONENT CIRCUIT DIAGRAMS

Before describing the various modes in which the memory system of the invention is operated, the circuit diagrams of the individual blocks shown in the diagram formed by FIGS. 1A and 1B are first described. Since these circuits are common to all of the registers of the system, their description does not include a letter when referring to particular reference numerals. Further, to identify the interconnection between the individul blocks of the system, the same junction and terminal points are included in several of the schematic diagrams. By way of example, terminal 19 is included in the schematic diagrams of switching networks 10, 11 and 13, to indicate that each of these blocks are connected to terminal 19.

*a. Storage device 14*

Figure 4B:
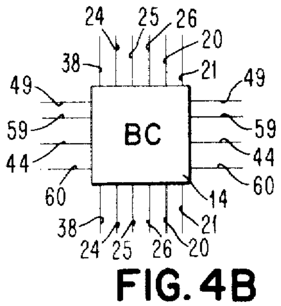
FIG. 4B is a block diagram which represents the circuit of FIG. 4A.
Figure 4A:
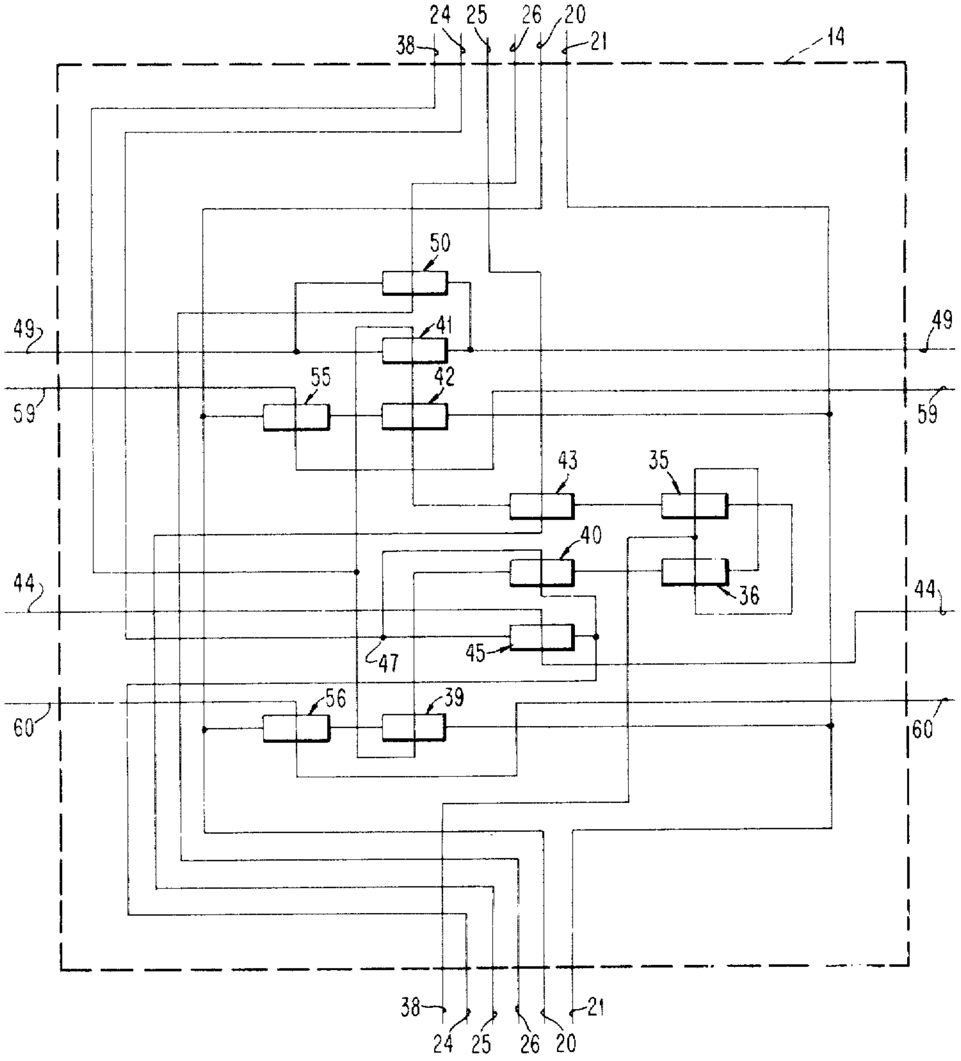
FIG. 4A is a schematic diagram of a storage device of the invention.

FIG. 4A is a schematic diagram of a storage device 14. As shown therein, storage device 14 includes a pair of cross connected gating devices 35 and 36. The auxiliary memory current from current source 37 (shown in FIG. 1A) flows along a line 38 and through the control conductor of one or the other of these gating devices by means of a pair of parallel superconducting paths, the particular path being determined by the particular binary data stored in the device. A first path representative of a binary 0 is formed by input line 38 (shown at the top of the diagram), the control conductor of gating device 39, the gate conductor of a set gating device 40, the gate conductor of gating device 36, the control conductor of gating device 35, and output line 38. The second path, representative of a binary 1 is formed by input line 38, the control conductor of a first read-out gating device 41, the control conductor of a gating device 42, the gate conductor of a reset gating device 43, the gate conductor of gating device 35, the control conductor of gating device 36, and output line 38. As can be seen by the interconnection of the gate and control conductors of gating devices 35 and 36, it is possible for only one of these parallel paths to be superconducting at any particular time, since the flow of current in one of these paths renders the other resistive.

In order to shift the auxiliary memory current from the path representative of a binary 0 to that representative of a binary 1 within storage device 14, line 44 is energized by control unit 77 (shown in FIG. 1A), to render the gate conductor of a gating device 45 resistive. During a read-in operation, the main memory current is caused to flow to storage device 14 along line 24 as will be understood from the system description that follows. This current flows along line 24, within storage device 14, to a junction 47. If a 1 were not to be entered, the major portion of the main memory current would flow through the gate conductor of gating device 45 since the inductance thereof is much less than the inductance of the parallel superconductive path including the control conductor of set gating device 40, thence returning to line 24. However, with line 44 energized by control unit 77, the gate conductor of gating device 45 is resistive and the main memory current, flowing from junction 47, is caused to flow through the control conductor of set gating device 40, again returning to line 24. The main memory current flowing through the control conductor of gating device 40 is effective to cause the gate conductor of gating device 40 to switch from the superconducting to the normal resistive state and introduce resistance in the previously superconducting binary 0 path. A portion of the auxiliary memory current flowing in the binary 0 path thereupon shifts into the binary 1 path, decreasing the resistance in the binary 1 path through the decreased current flow through the control conductor of gating device 35 and increasing the resistance in the binary 0 path through the shifted portion of the auxiliary memory flowing in the control conductor of gating device 36. The action of this current shift is cumulative until all the auxiliary memory current is shifted to a superconducting binary 1 path.

In order to reset a storage device, that is to read in a binary 0, a similar operation is followed. The main memory current is caused to flow into storage device 14 along line 25, as will be understood as the description proceeds, thence through the control conductor of reset gating device 43, and then along output line 25. The main memory current flowing through the control conductor of reset gating device 43 causes its gate conductor to switch from the superconducting to the normal resistance state and introduce resistance into the binary 1 path. A portion of the auxiliary memory current flowing in the binary 1 path thereupon shifts into the binary 0 path, decreasing the resistance in the binary 0 path through the decreased current flow through the control conductor of gating device 36, and increasing the resistance in the binary 1 path through the shifted portion of the auxiliary memory current flowing in the control conductor of gating device 35. Again this current shift is cumulative until all the auxiliary memory current is shifted to a superconducting binary 0 path.

A nondestructive read-out operation is employed to determine the data stored in a storage device 14. Line 49 is energized by control unit 77 of FIG. 1A and a read-out current flows through the parallel connected gate conductors of gating devices 41 and 50. During a read-out operation, the main memory current is caused to flow along line 26 to storage device 14, through the control conductor of gating device 50, causing the gate conductor thereof to become resistive, and then continues along line 26. If a binary 0 is stored in storage device 14, the read-out current from control unit 77, flowing along line 49, flows entirely through the superconducting gate conductor of gating device 41, and no voltage is developed across the parallel connected gate conductors of gating devices 41 and 50. However, with a binary 1 in storage, a voltage is developed across the gate conductors of gating devices 50 and 41 equal to the product of the read-out current and the resistance of the parallel gate conductors of gating devices 50 and 41. The gate conductor of gating device 50 is resistive due to the main memory current in the control conductor thereof, and that of gating device 41 is resistive due to the auxiliary memory current in the control conductor of gating device 41. Thus, a voltage is indicative of a binary 1, and no voltage is indicative of a binary 0. The presence or absence of this voltage is then sensed by control unit 77.

Included within storage device 14 is a pair of parallel paths connected between lines 20 and 21. The first consists of the gate conductors of gating devices 55 and 42, and is resistive if either a binary 1 is stored or line 59 is energized by control unit 77. The second path consists of the gate conductors of gating devices 56 and 39, and is resistive if either a binary 0 is stored or line 60 is energized by control unit 77. Since these paths are employed when the memory system is operated in the associative address mode, the operation thereof is further described in the detailed system description which follows. FIG. 4B is a block diagram of a storage device 14, and is employed in the block diagram of FIG. 1A and FIG. 1B.

*b. Switching network 10*

Figure 5A:
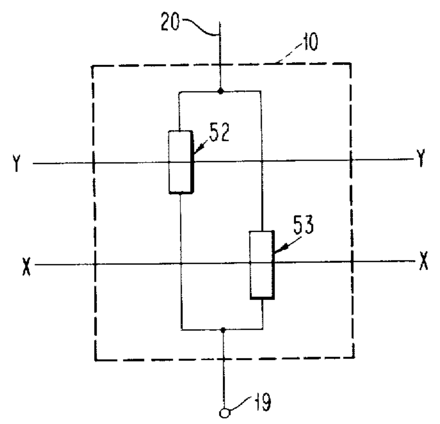
FIG. 5A is a schematic diagram of a switching network useful in the memory system of the invention.
Figure 5B:
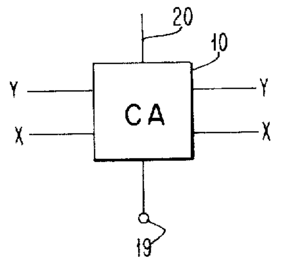
FIG. 5B is a block diagram which represents the circuit of FIG. 5A.

FIG. 5A is a schematic diagram of a switching network 10, operable as a coordinate address selector. A pair of gating devices 52 and 53 having their gate conductors connected in parallel is interposed between terminal 19 and line 20, the resistance of the gate conductor of gating device 52 being controlled by a Y selection line, and that of gating device 53 being controlled by an X selection line. Switching network 10 operates as an AND circuit, and the path between terminal 19 and line 20 is resistive only when both gating devices 52 and 53 are simultaneously energized by their corresponding Y and X selection lines. FIG. 5B is a block diagram of switching network 10 and is employed in the block diagram of FIGS. 1A and 1B.

*c. Switching network 11*

Figure 6A:
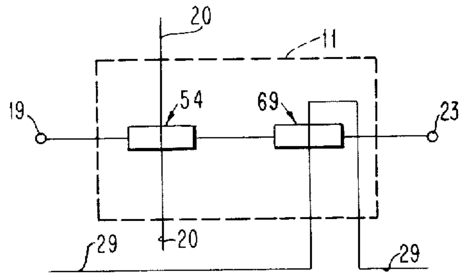
FIG. 6A is a schematic diagram of another switching network useful in the memory system of the invention.
Figure 6B:
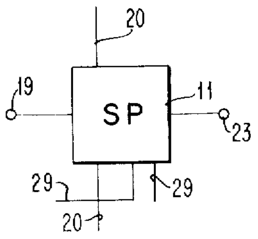
FIG. 6B is a block diagram which represents the circuit of FIG. 6A.

FIG. 6A is a schematic diagram of a switching network 11, which is selectively operable to provide an alternate superconducting path for the main memory current. A pair of serially connected gate conductors of gating devices 54 and 69 is interposed between terminal 19 and junction 23, the first of which is controlled by line 20 and the second by line 29. Thus, the path between terminal 19 and junction 23 is effectively an OR circuit and is resistive if either of these lines is energized. FIG. 6B is a block diagram which represents the circuit of FIG. 6A and is employed in the block diagram of FIG. 1A and FIG. 1B.

*d. Switching network 12*

Figure 7A:
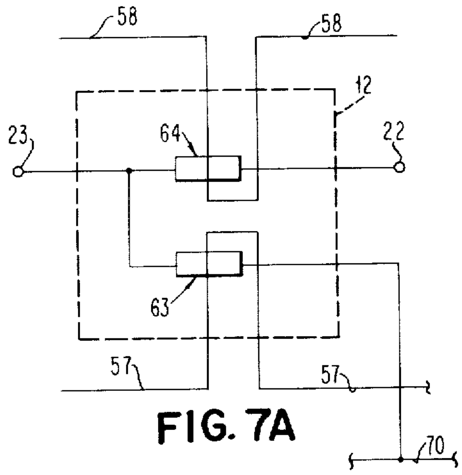
FIG. 7A is a schematic diagram of still another switching network useful in the memory system of the invention.
Figure 7B:
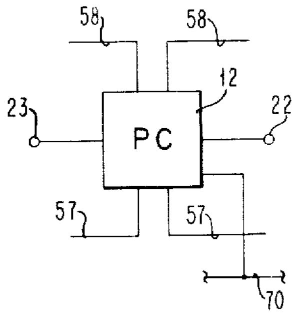
FIG. 7B is a block diagram which represents the circuit of FIG. 7A.

FIG. 7A is a schematic diagram of a switching network 12. A pair of gating devices 63 and 64 whose gate conductors are controlled by lines 57 and 58 respectively, provides a path for the main memory current from junction 23 either to junction 22 or to a common ground line 70. As will be understood from the description which follows, either gating device 63 or gating device 64 is resistive at a particular time, in order that only a single superconductive path exists through network 12. FIG. 7B is a block diagram which represents the circuit of FIG. 7A and is employed in the block diagram of FIG. 1A and FIG. 1B.

*e. Switching network 13*

Figure 8A:
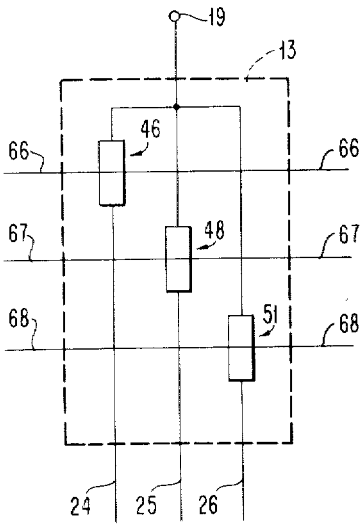
FIG. 8A is a schematic diagram of yet another switching network useful in the memory system of the invention.
Figure 8B:
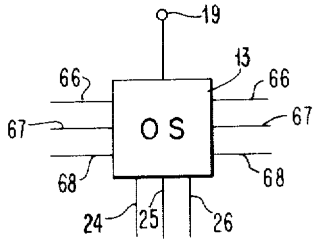
FIG. 8B is a block diagram which represents the circuit of FIG. 8A.

FIG. 8A is a schematic diagram of a switching network 13. Three gating devices 46, 48 and 51, the gate conductors of which are connected in parallel with terminal 19, provide a path for the main memory current along either line 24, 25 or 26 under control of lines 66, 67 and 68. As will be understood in the description of the operation of the memory system to follow, either gating devices 46, 48 and 51 are all resistive or, alternatively, only one of the three gate conductors of the parallel gating devices is superconducting during a particular time interval. FIG. 8B is a block diagram which represents the circuit of FIG. 8A and is employed in the block diagram of FIG. 1A and FIG. 1B.

*f. Switching network 15*

Figure 9A:
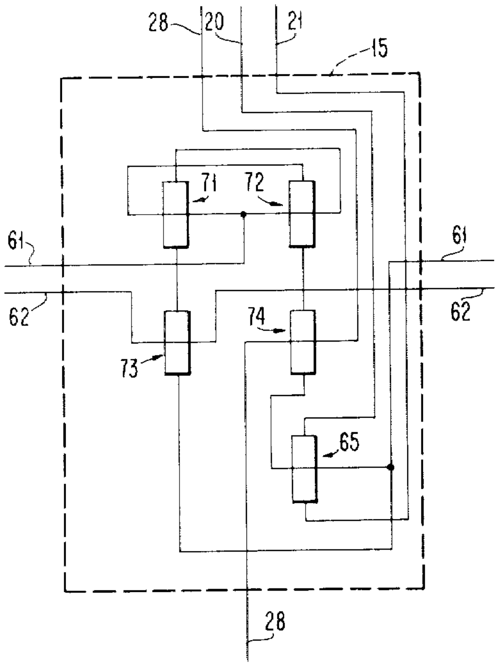
FIG. 9A is a schematic diagram of still another switching network useful in the memory system of the invention.
Figure 9B:
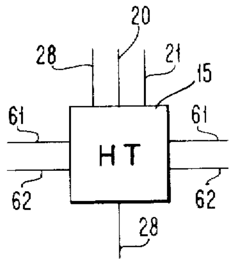
FIG. 9B is a block diagram which represents the circuit of FIG. 9A.

FIG. 9A is a schematic diagram of a switching network 15. This network contains a pair of cross connected gating devices 71 and 72, as well as set and reset gating devices 73 and 74, to control the state of the gate conductor of gating device 65, connected between lines 20 and 21. Current flow along line 61 is directed into one of two parallel paths within network 15. The first is formed by the control conductor of gating device 71, the gate conductor of gating device 72, the gate conductor of reset gating device 74, and the control conductor of gating device 65. The second path is formed by the control conductor of gating device 72, the gate conductor of gating device 71, and the gate conductor of set gating device 73. Current flow along line 62 renders the gate conductor of set gating device 73 resistive to force the current along line 61 to flow in the above described first path to render the gate conductor of gating device 65 resistive. Thereafter, current flow along lines 28 is effective to render the gate conductor of reset gating device 74 resistive to return the current to the second parallel path and thereby render the gate conductor of gating device 65 superconducting. FIG. 9B is a block diagram which represents the switching network of FIG. 9A and is used in the block diagram of FIG. 1A and FIG. 1B.

SYSTEM OPERATION

In the description of the operation of the memory system to follow, reference should be had particularly to FIG.1A as an aid in understanding the manner in which, by way of example, register A, shown therein, is conditioned for read-in and read-out operations, first in the coordinate address mode and second in the associative address mode, as well as the various current paths employed in these operations. Additionally, reference should also be had to the general schematic diagrams shown in FIGS. 4 through 9, as required, as the description of the system operation proceeds. Further, by way of example, gating device 52 shown controlled by a Y selection line in FIG. 5A will be identified as gating device 52 of switching network 10A in describing the operation of gating device 52 controlled by the Y selection line in register A.

As has been generally indicated hereinbefore, the main memory current from source 18 normally flows through a superconducting path in each of the registers of the memory system. However, when registers are conditioned for read-in and read-out operations, this current is shifted to alternate superconducting paths at the conditioned registers only, these paths being selectively provided by the switching networks 11. More particularly, during a quiescent time interval, the main current flows from source 18 first to terminal 19A of register A. From terminal 19A, this current flows through a superconducting paths in switching network 10A to line 20A. This occurs because, during this time interval, the possible superconducting paths through switching networks 11A and 13A are both resistive. The path through switching network 10A, however, is superconducting since, during a quiescent time interval, none of the X and Y selection lines are energized. The path through switching network 11A from terminal 19A is maintained resistive by the main memory current flowing along line 20A and through the control conductor of gating device 54 thereof (FIG. 6A). As will be further understood as the description proceeds, during read-in and read-out operations, the superconductive path through switching network 11A is maintained resistive until the main memory current again flows in the quiescent path and this current is thereafter effective of and by itself to maintain the path through switching network 11A resistive. Switching network 13A is maintained resistive by control unit 77 which, during a quiescent time interval maintains each of lines 66, 67 and 68 energized to thereby cause the gate conductors of gating devices 46, 48 and 51 of switching network 13A (FIG. 8A) to be resistive.

The main memory current continues along line 20A, through the serially connected storage devices 14AA, 14BA, 14CA, etc., to switching network 15A. The main memory current thence flows to line 21A through one or more of parallel superconducting paths which exist in each of the storage devices 14AA, 14BA, 14CA, etc. and switching network 15A. A superconducting path occurs in each of the storage devices of register A through either the serially connected gate conductors of gating devices 55 and 42 or the serially connected gate conductors of gating devices 56 and 39 thereof (FIG. 4A). This superconducting path exists, when the memory system is operated in the coordinate address mode, because the gate conductors of gating devices 55 and 56 are normally maintained superconducting, and only the gate conductor of gating device 42 is resistive (if a binary 1 is stored in a storage device 14) or the gate conductor of gating device 39 is resistive (if a binary 0 is stored therein). For this reason, one or the other of these parallel paths in each storage device is superconducting depending on the information stored therein. Another parallel superconducting path exists between lines 20A and 21A in switching network 15A through the superconducting gate conductor of gating device 65A.

*a. Coordinate address mode*

In order to condition the memory system for a read-in or read-out operation in the coordinate address mode, control unit 77 is effective to energize line 57 and deenergize lines 58, 59A, 59B, 59C, etc., 60A, 60B, 60C, etc., 61 and 62. Energization of line 57 is effective to cause the gate conductor of gating device 63 in each switching network 12 (FIG. 7A) to be resistive and the deenergization of line 58 is effective to allow the gate conductors of each gating device 64 to remain superconducting. This provides a superconducting path between each of junctions 23 to 22 through switching network 12 and blocks a path from junction 23 to the common ground line 70. Lines 59A, 59B, 59C, etc., and 60A, 60B, 60C, etc., are deenergized to maintain the gate conductors of gating devices 55 and 56 in each storage device 14 superconducting, to thus provide a superconducting path between lines 20 and 21. Since switching network 15 is not employed when the memory system is operated in the coordinate address mode, lines 61 and 62 are deenergized to ensure that the gate conductor of gating device 65 in each of the switching networks 15 affords a superconducting path between each of the lines 20 and 21, if, for any reason, both of the parallel paths controlled by lines 59 and 60, as well as the information stored in storage devices 14, are resistive through all of the storage devices in a register, thereby blocking the superconducting quiescent paths between lines 20 and 21.

To condition a register for a read-in operation, the main memory current must first be shifted out of the quiescent path and through switching network 11 connected between terminal 19 and junction 23. The main memory current flowing through the alternate path provided by switching network 11 at the conditioned register may then be operated upon to perform a read-in operation. Assume it is desired to condition register A and to store a binary one in storage devices 14AA and 14BA. As hereinbefore stated during a quiescent time interval, each of lines 66, 67 and 68 are normally energized by control unit 77 to block any superconducting path through each of switching networks 13. Now lines $X_1$ and $Y_1$ are energized, causing the gate conductors of gating devices 53 and 52, respectively, in switching network 10A (FIG. 5A) to become resistive, thus blocking the quiescent superconducting path between terminal 19A and line 20A. At this time, the main memory current begins to shift into the parallel resistive paths provided by switching network 11A and switching network 13A, causing a decrease in current along line 20A. The decrease in current along line 20A effectively decreases the resistance of the gate conductor of gating device 54 of switching network 11A, and an increased portion of the main memory current begins to flow therethrough. This current shift is cumulative until finally all of the main memory current flows through a new superconducting path from terminal 19A, through the gate conductors of gating devices 54 and 69 of switching network 11A, to junction 23A. From junction 23A, the main memory current flows through the superconducting gate conductor of gating device 64 of switching network 12A, to junction 22A and thence to terminal 19B (FIG. 1B). The main memory current then continues in the remaining registers of the memory system flowing in the previously described quiescent paths through each register. At this time, register A, controlled by selection lines $X_1$ and $Y_1$, is the only register in the memory system at which the main memory current is flowing through an alternate superconducting path provided by switching network 11A. Next, lines 44A and 44B are energized by control unit 77 to cause the gate conductor of gating device 45 of storage device 14AA and the gate conductor of gating device 45 of storage device 14BA (FIG. 4A) to become resistive. Each of the gate conductors of registers B, C, etc., controlled by these lines will also become resistive but as will be understood as the description proceeds, since only register A has been conditioned, information will be read into this register only. To perform a read-in operation, the current is shifted from the alternate path provided by switching network 11A, to line 24A and along line 24A through each of the storage devices in the conditioned register. This is accomplished first by control unit 77 deenergizing line 66, permitting the gate conductor of gating device 46 of switching network 13A (FIG. 8A) to become superconducting. Every gate conductor in the memory system controlled by this line, that is the gate conductor of gating device 46 of switching network 13B, the gate conductor of gating device 46 of switching network 13C (not shown), etc., also becomes superconducting. This provides still another superconducting path at register A from terminal 19A along line 24A to junction 27A, thence along line 28A through switching network 15A and returning to junction 23A. A similar parallel superconducting path also now exists in each of the remaining registers in memory, but in all cases the main memory current does not flow through this new superconducting path since it is already established in a parallel superconducting path. However, only at the conditioned register A is the main memory current flowin in an alternate superconducting path provided by switching network 11A. Next, line 29 is energized causing the gate conductor of gating device 69 of switching network 11A (FIG. 6A) to become resistive and destroy the superconducting path through which the main memory current has been flowing at the conditioned register only. This, in turn, causes the main memory current to shift from switching network 11A to the now superconducting path provided by line 24A, etc. For this reason, the main memory current flows through the gate conductor of gating device 46 of switching network 13A, along line 24A through all storage devices 14AA, 14BA, 14CA, etc., setting all the storage devices of register A, having line 44 energized, in this example storage devices 14AA and 14BA, and thereby store a binary one in these registers, as has previously been described. Next, the $X_1$ and $Y_1$ selection lines are deenergized. Line 66 is then reenergized by control unit 77 blocking the superconducting path through switching network 13A and, since switching network 11A is also resistive at this time with line 29 still energized, the main memory current is reshifted to the now superconducting quiescent path. Lines 29 and 44 are next deenergized and the memory system is returned to the quiescent condition and ready for any operation at any register.

To read out a word stored in memory, essentially the same procedure is followed. That is, a particular register is first conditioned by shifting the main memory current from the quiescent path through an alternate path provided by switching network 11, and secondly shift the current from switching network 11 at the conditioned register through switching network 13 and thence along read-out line 26. Continuing with the example employing register A, to read out a word therein selection lines $X_1$ and $Y_1$ are energized causing the gate conductors of gating devices 52 and 53 of switching network 10A to become resistive. Since lines 66, 67 and 68 are energized, no superconducting path exists through switching network 13A. Also, as previously explained, with the main memory current flowing through the quiescent path, switching network 11A is also resistive. Again, since each of the parallel paths from terminal 19A are resistive the main memory current begins to shift out of the previously superconducting path through switching network 10A and a cumulative current shift continues until all of the main memory current is now flowing from terminal 19A through an alternate superconducting path in switching network 11A. Again all the main memory current flows through a switching network 11 only at the conditioned register A, controlled by the $X_1$ $Y_1$ selection lines. Control unit 77 is next effective to energize all of the read-out lines 49A, 49B, 49C, etc. To apply the main memory current through switching network 13A and along line 26A, line 68 is deenergized by control unit 77 allowing the gate conductor of gating device 51 in switching network 13A to become superconducting. This provides a new superconducting path at register A from terminal 19A through the gate conductor of gating device 51 in switching network 13A along line 26A, through each of the storage devices in the register, to junction 27A, thence along line 28A through switching network 15A, continuing along line 28A to junction 23A. Additionally, the remaining registers in the memory system are also provided with this new superconducting path since the deenergization of line 68A also allows the remaining gate conductors of gating device 51 of switching networks 13B, 13C, etc. controlled by this line to become superconducting. Again however, in all registers the main memory current does not flow through any of these new superconducting paths since it already is established in a parallel superconducting path. However, only at the conditioned register A is the main memory current flowing through an alternate superconducting path provided by switching network 11A. Next, line 29 is energized causing the main memory current through switching network 11A to flow through the new superconducting path and along line 26A to thereby read out the information stored in register A by developing a voltage which appears on each of the 49 lines threading a storage device storing a binary one as explained in the detailed description of storage device 14. As before, line 68 is reenergized to block the new superconducting path and the $X_1$ and $Y_1$ lines are deenergized, causing the main memory current to return to the quiescent path. Next, line 29 and all of the 49 lines are deenergized to prepare the memory for the next read-in or read-out operation.

It should now be understood that a similar program is followed to reset, that is to read a binary zero into, all the storage devices at a particular register. Continuing with register A as an example, the main memory current is first shifted from the quiescent path through an alternate path provided by switching network 11A under control of selection lines $X_1$ and $Y_1$. Next, control unit 77 deenergizes line 67 and then energizes line 29 causing the main memory current to shift from switching network 11A through the gate conductor of gating device 48 of switching network 13A, thence along line 25A through all of the storage devices of register A to read in a binary zero into all storage devices of register A.

*b. Associative Address Mode*

(1) *General.*—Operation of the memory system in the associative address mode provides a method of performing a read-in or read-out operation on one or more registers selected in response to the information stored therein. In this mode signals representative of some or all of the information which may be located in the registers are applied to the storage devices of all registers in memory. A simultaneous comparison is then performed to select all registers containing information corresponding to the applied signals. In the preferred embodiment illustrated herein, if more than one register has been selected by the applied signals, the registers are serially conditioned for read-in or read-out operation, but it should be understood by one skilled in the art of large capacity memory systems that all the registers which have been simultaneously selected could be conditioned for a parallel read-in and read-out operation.

The operations of read-in, read-out and reset are independent of the method by which the particular register has been conditioned, thus when the memory system is operated in the associative address mode, the main memory current must also be first shifted through an alternate superconducting path at the selected register and then directed along either line 24, 25, or 26 depending on the operation to be performed. Operation in the associative address mode differs from that in the coordinate address mode primarily in the manner by which the main memory current is first shifted through the alternate path. Additionally, since the operations of writing, reading and resetting are performed serially by word in the preferred embodiment, it is required to remove the main memory current from all registers following the first register in memory having the desired association pattern.

(2) *Fully associative memory system.*—When the memory system of the invention is operated as a fully associative memory system, control unit 77 is effective to energize lines 58, 61 and 62 and to deenergize line 57. In this manner the switching network 12 of each register is set to present a superconducting path only from terminal 23 to the common ground line 70 (FIG. 7A), since the gate of gating device 63 is superconducting with line 57 deenergized and the gate conductor of gating device 64 is resistive with line 58 energized. In this manner the main memory current which flows through the alternative superconducting path provided by switching network 11 at a conditioned register to junction 23 is shunted to ground and removed from the remaining registers in memory. Line 61 is energized to provide a current through each of the switching networks 15, and line 62 is energized to direct the current flowing along line 61 to cause the gate conductor of gating device 65 in each of switching networks 15 (FIG. 9A) to become resistive to prevent a superconducting path existing between lines 20 and 21 in each of switching networks 15. With line 62 energized the gate conductor of set gating device 73 in switching network 15 is resistive and the current flowing along line 61 therefore flows through the control conductor of gating device 71, the gate conductors of gating devices 72 and 74, and finally through the control conductor of gating device 65 as hereinbefore explained in a detailed description of switching network 15. Next, line 62 is deenergized. With each of the gating devices 65 resistive, current in the association pattern lines 59A and 60A, 59B and 60B, 59C and 60C, etc. can be used to select registers in the memory system under control of control unit 77 depending on whether or not the word stored at a register satisfies the association pattern set up by the 59 and 60 lines.

To operate the memory as a fully associative address memory the series of 59 and 60 lines are energized such that all 59 lines are energized except for those storage devices which correspond to binary one in the association pattern. Correspondingly, all 60 lines are energized except for those storage devices which correspond to binary zero in the association pattern.

Figure 10:
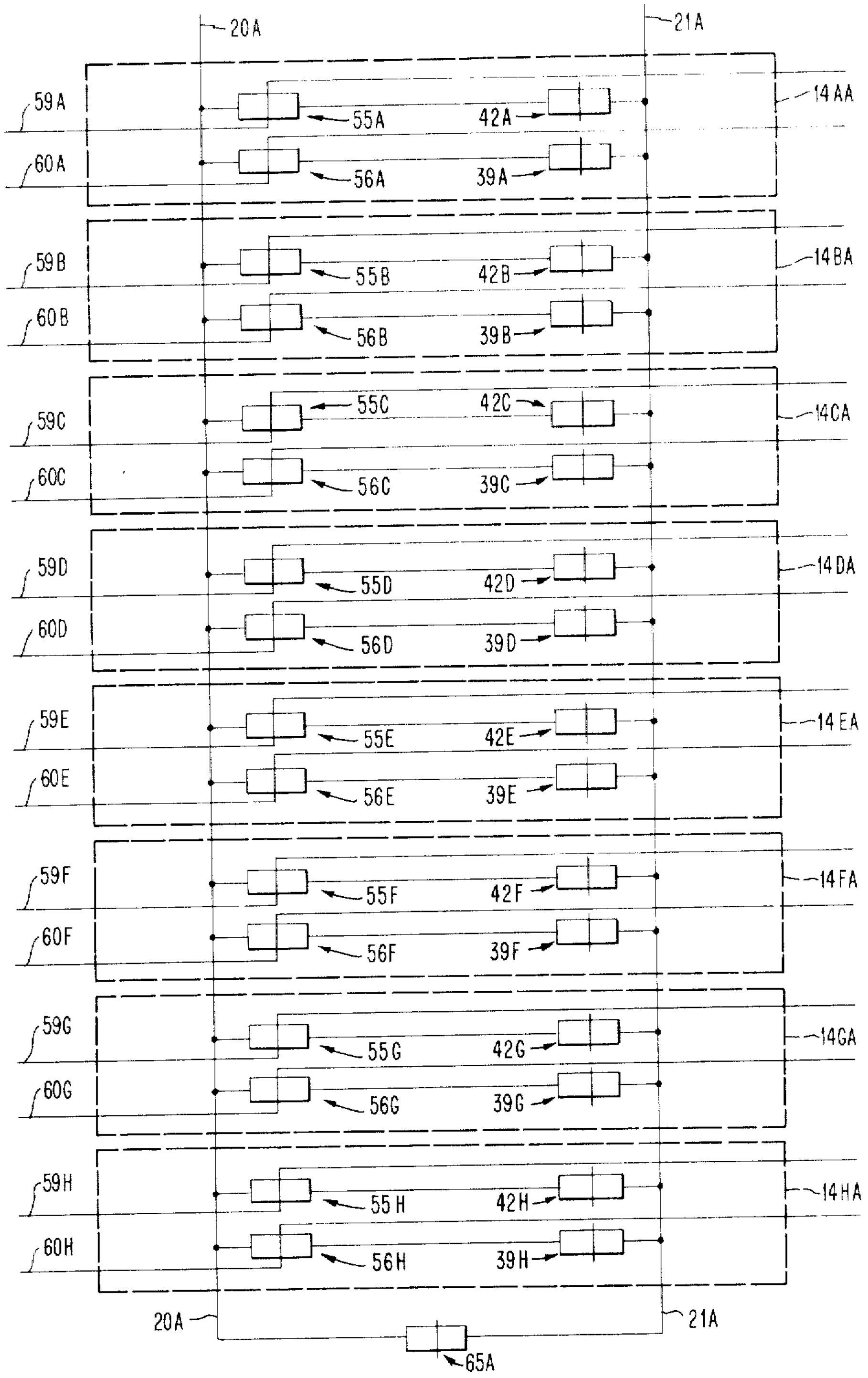
FIG. 10 is a partial schematic diagram of the circuits employed to select a register in the associative address mode.

Referring now to FIG. 10, there is shown a matrix formed by the parallel paths existing between line 20A and line 21A of a register containing eight storage devices, by way of example, it being understood that more or less storage devices could be employed. Further, in this figure only each gating device employs a letter corresponding to a particular storage device. If Q denotes an unknown bit, and words having the form QQQ 101 QQ are sought in memory, the settings of the 59 and 60 lines shown in FIG. 10 are as follows: Lines 59A, 59B, 59C, 59E, 59G, 59H, 60A, 60B, 60C, 60D, 60F, 60G, 60H are energized and lines 59D, 59F and 60E are deenergized. Lines 59A and 60A of storage device 14AA are energized, since for the chosen example the register desired to be selected will be chosen independent of whether a one or zero is stored in storage device 14AA. Similarly lines 59B and 60B, lines 59C and 60C, lines 59G and 60G, lines 59H and 60H, are energized since the register sought will be selected independent of the data stored in storage device 14BA, 14CA, 14GA and 14HA. Lines 59D and 59F are not energized because the desired word in memory is to have ones in these storage devices. Similarly, line 60E is not energized since the association pattern is set to look for a zero in the storage device 14EA.

The parallel matrix between lines 20A and 21A consisting of the parallel paths in each storage device controlled by the 59 and 60 lines as well as the path consisting of the gate conductor of gating device 65A will be resistive if all 59 lines, all 60 lines and control conductor of gating device 65A are energized. If any 59 line is not energized, the matrix can still be resistive provided there is a one in storage in that storage device of the stored word corresponding to the 59 lines not energized, so that the gate conductor of gating device 42 is resistive. Similarly, if any 60 line is not energized, the matrix can be resistive provided there is a zero in storage in a storage device corresponding to the unenergized 60 line, so that the gate conductor of gating device 39 is resistive, that is the paths within the matrix are resistive if either the 59 and 60 lines for each storage device are energized or the word has the correct ones and zeros corresponding to the ones and zeros in the association pattern. For example, if the stored word has all ones which correspond to a zero in storage at that register, then the parallel matrix will be resistive if only the 60 lines are energized. Similarly, if the stored word is all zeros corresponding to an empty register, the parallel paths in the matrix will all be resistive if only the 59 lines are energized. Thus at the first register in memory at which all the parallel paths in the matrix are resistive, the register is as fully selected as if it had been referred to by its coordinate address, since the main memory current can no longer flow through the quiescent path between lines 20 and 21 and, as has been previously discussed during the description of the coordinate address mode, a current shift begins with the main memory current shifting through an alternate superconducting path provided by switching network 11. It will be understood that additional registers will also be selected simultaneously if they also correspond to the desired association pattern.

This simultaneous selection mode of operation is available if the network 12 is operated with line 57 energized and line 58 de-energized so that the main memory current is not shunted to ground line 70. However, in the preferred embodiment the register containing the first word in memory corresponding to the association pattern is the only register conditioned at this time, for a read-in or read-out operation since the main memory current flowing through switching network 11 to junction 23 is shunted to common ground line 70 by switching network 12. The memory current flowing along line 70, also flows through comparison indicator 75 to show that a comparison has been obtained and a word corresponding to the association pattern is stored in memory and further that the first register containing this word is conditioned for a read-in or read-out operation. This necessity of removing the memory current from the remaining registers may cause slower operation in the fully associative address memory depending, of course, on the position of the conditioned register. When the main memory current is flowing through a switching network 11, as is shown by indicator 75 in the common ground line, read-in, read-out or reset of the conditioned register can be performed in a manner similar to that hereinabove described, with reference to operation of the memory system in the coordinate address mode. When either of these operations is initiated switching network 15 at the conditioned register is automatically reset, so that the gate conductor of gating device 65 therein becomes superconducting, through the action of the main memory current flowing along line 24, 25 or 26, depending on the operation being performed, to junction 27 thence along line 28 through the control conductor of reset gating device 74 of switching network 15 (FIG. 9A). In this manner, after a read-in or read-out operation has been performed on the first register in memory corresponding to the association pattern, additional registers in memory having the desired association pattern can then be operated upon since the first register now has a superconducting path between lines 20 and 21 and therefore no longer responds to the association pattern. When the desired operation is completed line 66, 67 or 68 is reenergized and the main memory current is caused to flow through a switching network 10 along line 20 through the now superconducting gate conductor of gating device 65 in switching network 15 along line 28 to junction 22 and on to the next word in memory. This causes the next register in memory selected as satisfying the association pattern set up by the 59 and 60 lines to be conditioned. After all word satisfying the association pattern have been operated upon as is shown by the no comparison indicator 76 in the main memory current line beyond the last word in memory (FIG. 1B), line 62 is energized to set all the switching networks 15 to block a superconducting path through the gate conductor of gating device 65 therein.

In this manner, the memory is set to operate with the next association pattern set up by control unit 77.

As an aid in understanding the operation of the memory as a fully associative memory system, assume that it is desired to load a word into the first empty register. Energizing all of the 59 lines and none of the 60 lines automatically finds the first register in memory wherein each of the storage devices in the register is storing a binary zero. The word to be entered into memory is conditioned by energizing the 44 lines corresponding to the storage devices wherein it is desired to enter a binary one. As a particular example, if register A is the first empty register, and it is desired to enter a one in the storage device 14BA, line 44B is energized. Next, lines 59A, 59B, 59C, etc., are energized and lines 60A, 60B, 60C, etc., are deenergized, line 62 is energized to cause the gate conductor of gating device 65A in hold trigger 15A to be resistive as hereinbefore described and remove the superconducting path between lines 20A and 21A in switching network 15A. Since it has been stated that register $X_1Y_1$ contains a zero in each of its storage devices, the main memory current from current source 18 arriving at terminal 19A can no longer flow through the quiescent path since each of the 59 lines are energized causing the gate conductor of each gating device 55 to be resistive and the storage of the zero blocks the possible superconducting path through the gate conductors of each gating device 39 (FIG. 10) since the auxiliary memory current flowing through the binary zero path causes each of the gating devices 39 to be resistive. Thus the main memory current flows from terminal 19A through switching network 11A to terminal 23A, through switching network 12A, to the common ground line 70, as hereinbefore described. Now line 66 is deenergized and line 29 is energized to close the alternate superconducting path through network 11A and open a superconducting path through switching network 13A. The main memory current now flows down line 24A to store a binary one in storage device 14BA, since only line 44B has been energized. Next all the 59 lines are deenergized and line 66 is reenergized. All the main memory current now flows through the matrix or the gate of gating device 65 as shown in FIG. 10 and after deenergizing lines 29 and 44 the memory is quiescent again. It is apparent that the operations of read-out and reset follow a similar procedure and each of these operations is selected by the switching network 13 under control of control unit 77 as hereinbefore described.

A further feature of the memory system of the invention is the fact that all of the registers can be reset in a single operation. This is accomplished by energizing line 57, line 29, deenergizing lines 58 and 67, and energizing all 59 and 60 lines. In this manner, each register is serially selected regardless of its contents. Under these conditions the current flows from current source 18 to terminal 19A, and since no superconducting path exists between lines 20A and 21A with all of the 59 and 60 lines in register $X_1$ $Y_1$ energized, and further no superconducting path exists through network 11A with line 29 energized, the current flows from terminal 19A, through the gate conductor of gating device 48 of switching network 13A, along line 25A and through the control conductor of reset gating device 43 in each storage device 14 of register A to junction 27A, along line 28A through the control conductor of gating device 74 of network 15A, continuing along line 28A to junction 23A. From junction 23A, the main memory current flows through the superconducting gate conductor of gating device 64 of network 12A, thence to junction 22A continuing to terminal 19B and in a similar path through each of the following registers of the memory system.

(3) *Catalog memory system.*—Operation of the memory system as a catalog memory system is similar to the hereinbefore described operation as a fully associative memory system, it being necessary only to employ a different associative pattern. Thus, to determine whether or not a particular word is contained within the memory system, comparison of the information contained in all storage devices of each register is simultaneously performed. By way of example, if it is desired to determine if 1010 10 10 is stored in memory, lines 60A, 59B, 60C, 59D, 60E, 59F, 60G, 59H are energized and a comparison is indicated by indicator 75 in common ground line 70. Referring again to FIG. 10, it will be seen that when this register stores the word of the example, the gate conductors of gating devices 42A, 39B, 42C, 39D, 42E, 39F, 42G, and 39H are resistive, and together with the energized 59 and 60 lines, thereby blocks any superconducting path between lines 20A and 21A at the register storing the searched for word. The main memory current is thus shifted through the alternate path at the register storing the desired word, to the common ground line 70, thence flows through comparison indicator 75 to ground. If the word is not stored in memory, the main memory current is not shifted through an alternate path and will thus flow through no comparison indicator 76, indicating that no comparison has been performed.

(4) *Associative memory system.*—Further, operation of the memory as an associative memory system is accomplished by effectively dividing each register into two registers, the first for storing information and the second for storing the tag associated therewith. In this manner, selected ones of the storage devices in the memory registers comprise a data register and the remaining storage devices of a memory register comprise a tag register. It is only necessary that the corresponding storage devices of each memory register are chosen for the tag register. As a particular example, the choice of storage devices 14AA, 14BA and 14CA of register A to store tag information (shown in FIG. 1A), requires that storage devices 14AB, 14BB and 14CB of register B (shown in FIG. 1B) also store tag information, etc. To interrogate the memory when operated as an associative memory system, all 59 and 60 lines threaded through the storage devices comprising the information register are first energized, and operation then proceeds as described above with respect to operation of the memory as a fully associative memory system. That is, the tag associative pattern is applied to the storage devices comprising the tag registers and if the interrogated tag is stored therein a match will be shown by comparison indicator 75 in the common ground line 70 and no match shown by no comparison indicator 76.

Although control unit 77 has not been described in detail, the necessary circuits and controls therefore required to energize selected lines will be understood by those skilled in the art of large scale memory systems. Similarly, indicators 75 and 76 have not been described since there may be a cryotron, a superconductive relay, or any other current operated device that provides a superconducting path for the main memory current, the choice thereof being one of convenience.

While the invention has been particularly shown and described with reference to a preferred embodiment thereof, it will be understood by those skilled in the art that various changes in form and details may be made therein without departing from the spirit and scope of the invention.

I claim:

1. A cryogenic memory system operable at a superconductive temperature, said system being selectively operable in the coordinate address mode and the associative address mode, comprising; a plurality of register for storing information; each of said registers having a unique address and being capable of being conditioned to read-in and read-out information; a current source; superconducting means for conducting current from said source through a quiescent superconducting path in each of said registers; a plurality of interrogating means for conditioning said registers by shifting said current from said quiescent path to an alternate superconductive path at selected registers; a first of said plurality of interrogating means being responsive to a coordinate address; and a second of said plurality of interrogating means being responsive both to information stored in said registers and signals applied to said plurality of registers, said signals being determined by predetermined data storable in said plurality of registers.

2. A cryogenic memory system operable at a superconductive temperature comprising:

a plurality of registers for storing information; each of said registers including a plurality of superconductive parallel paths, a source of electrical current;

superconducting means connecting said source and the current paths through all of said plurality of registers electrically in series;

means for conditioning registers having predetermined information stored therein for read-in and read-out operations, including means responsive to information stored in said registers for destroying superconductivity in a first portion of said parallel current paths through each register, means for applying a predetermined matching pattern of information to all of said storage registers, means responsive to said matching pattern applying means for destroying superconductivity in a second portion of said parallel current paths through each register, whereby superconductivity is destroyed in all of said current paths through registers storing information corresponding to said predetermined information only; and means to read-in and read-out information in said conditioned registers including means responsive to the operation of said read-in and read-out means for restoring superconductivity in at least one of said parallel current paths through each conditioned register.

References Cited by the Examiner

UNITED STATES PATENTS

| | | | |
|---|---|---|---|
| 2,604,262 | 7/1952 | Phelps | 235—156 |
| 2,719,965 | 10/1955 | Person | 340—172.5 |
| 2,721,990 | 10/1955 | McNaney | 340—172.5 |
| 2,764,750 | 9/1956 | Wright | 340—172.5 |
| 2,832,897 | 4/1958 | Buck | 340—173.1 |
| 2,920,313 | 1/1960 | Nettleton | 340—172.5 |
| 3,093,814 | 6/1963 | Wagner et al. | 340—172.5 |
| 3,105,143 | 9/1963 | Hosier et al. | 340—172.5 |
| 3,107,343 | 10/1963 | Poole | 340—172.5 |
| 3,128,452 | 4/1964 | Andrews | 340—172.5 |
| 3,134,095 | 5/1964 | Heath | 340—172.5 |

OTHER REFERENCES

Handbook of Automation, Computation and Control, vol. 2, by Grabbe, Ramo and Wooldridge, chapter 2, pages 2–144 and 2–145, 1959.

ROBERT C. BAILEY, *Primary Examiner.*

EVERETT R. REYNOLDS, STEPHEN W. CAPELLI, MALCOLM A. MORRISON, *Examiners.*